United States Patent [19]

Chan et al.

[11] Patent Number: 5,374,812
[45] Date of Patent: Dec. 20, 1994

[54] RECESSED LIGHTING FIXTURE

[75] Inventors: Kingsley Chan, Guttenburg; Neil Russo, Howell; Albert L. Newman, West Orange; Cristina C. Chin, Cranford, all of N.J.

[73] Assignee: Lightolier Division of the Genlyte Group Incorporated, Secaucus, N.J.

[21] Appl. No.: 78,406

[22] Filed: Jun. 17, 1993

Related U.S. Application Data

[63] Continuation-in-part of Ser. No. 827,112, Jan. 28, 1992, Pat. No. 5,222,800.

[51] Int. Cl.⁵ .............................................. H02G 3/08
[52] U.S. Cl. ...................................... 220/3.6; 220/3.9; 174/48; 362/364
[58] Field of Search ..................... 174/48; 220/3.6, 3.5, 220/3.9; 362/364, 365

[56] References Cited

U.S. PATENT DOCUMENTS

| | | | |
|---|---|---|---|
| 2,757,818 | 8/1956 | Chamberlain | 220/3.5 |
| 2,842,281 | 7/1958 | Chisholm | 220/3.6 |
| 3,057,993 | 10/1962 | Gellert | 362/364 |
| 3,082,023 | 3/1963 | Rudolph et al. | |
| 3,420,995 | 1/1969 | Dunckel | |
| 3,597,889 | 10/1969 | Lo Nigro | |
| 3,749,873 | 7/1973 | Harper et al. | 220/3.6 |
| 4,039,822 | 8/1977 | Chan et al. | |
| 4,041,657 | 8/1977 | Schuplin | |
| 4,086,480 | 4/1978 | Lahm | |
| 4,114,327 | 9/1978 | Williams | |
| 4,230,900 | 10/1980 | Speet | |
| 4,408,262 | 10/1983 | Kusmer | |
| 4,605,816 | 8/1986 | Jorgensen et al. | |
| 4,646,212 | 2/1987 | Florence | |
| 4,751,624 | 6/1988 | Russo et al. | 362/364 |

OTHER PUBLICATIONS

Lightolier Brochure IS:1102T1R (no date).

*Primary Examiner*—Carroll B. Dority
*Attorney, Agent, or Firm*—Hopgood, Calimafde, Kalil & Judlowe

[57] ABSTRACT

A lighting fixture having a simplified structure is provided with such benefits as a junction box attached either permanently or releasably to the housing, a full reflector for improved optics, and support means for installation in different ceiling structures. The reflector is positionable within the housing, whereby inexact or inaccurate mounting of the housing to the ceiling structure can be corrected by changing the orientation of the reflector. Also provided are novel junction boxes. In various embodiments, the junction box may contain an L-shaped door, to cover an L-shaped opening which allows the interior of the junction box to be inspected from the bottom after installation. Another embodiment of junction box includes side walls flexibly joined to permit installation and removal of the junction box. Preferably, this latter embodiment is installed in a fixture through the bottom opening through which the reflector, socket, bulb, and the like are installed.

1 Claim, 13 Drawing Sheets

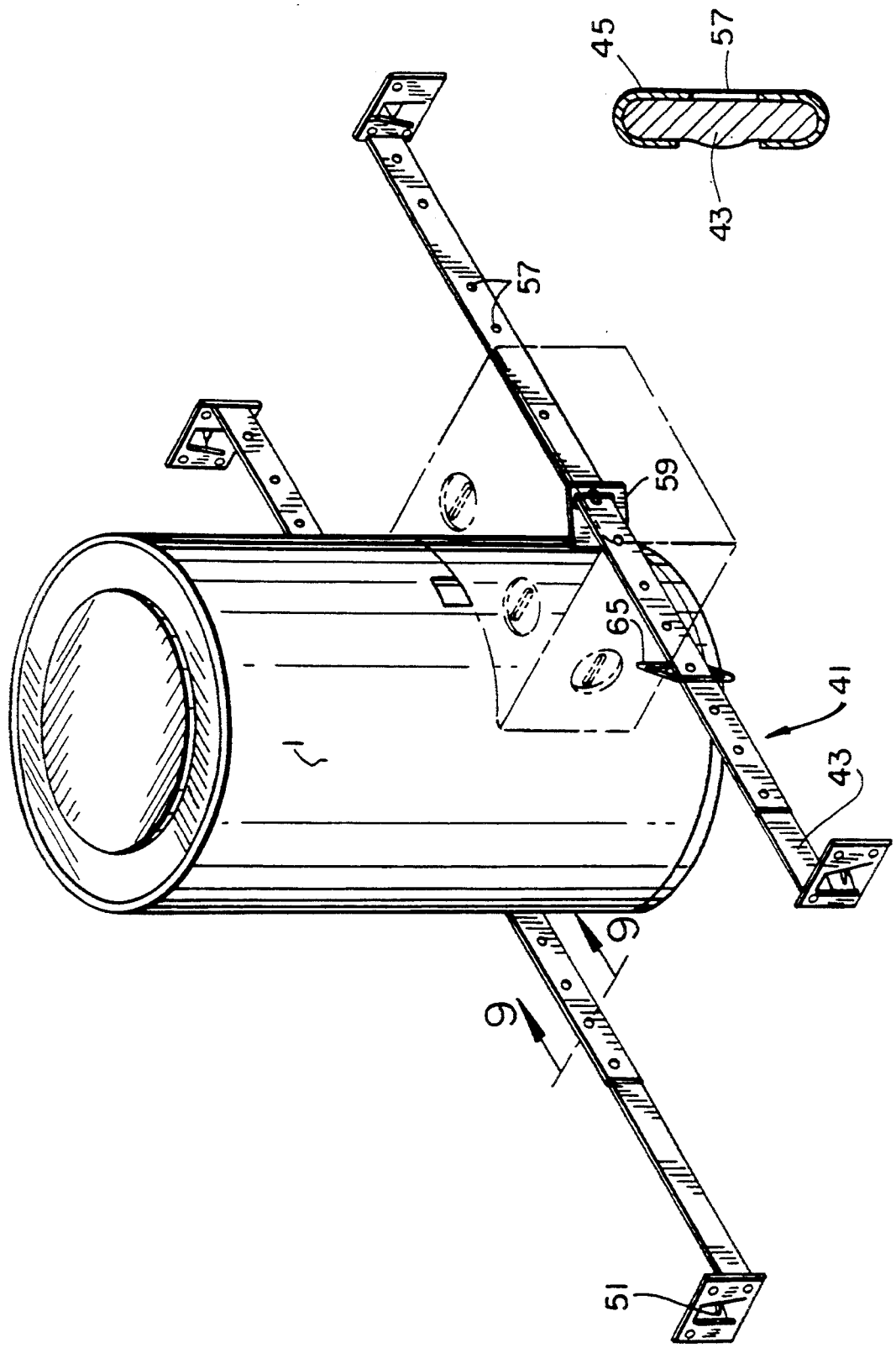

RECESSED LIGHTING FIXTURE

This is a continuation-in-part of U.S. application Ser. No. 07/827,112 filed Jan. 28, 1992, now U.S. Pat. No. 5,222,800.

BACKGROUND OF THE INVENTION

1. Field of the Invention

This invention relates to a recessed lighting fixture that is easier to install, has fewer parts, better optics, and is more readily accessible for adjustment, alteration, and inspection than conventional fixtures. More particularly, this fixture is especially adapted for ceiling installation, and has a unique, releasably mounted junction box which can be installed, rewired or removed without substantial alteration to the fixture or the ceiling.

2. Description of the Related Art

As a brief retrospective of indoor lighting, the standard incandescent light bulb, generally known as an "A-type" bulb, is held in a socket through which electricity is supplied to the bulb. As now typically standardized, the bulb is secured with metal threads on the end of the bulb electrically connecting with the threaded socket. Over time it was appreciated that a naked light bulb was not only unattractive but also inefficient in distributing light; that is, because light radiates essentially spherically from the filament in an A-type bulb, light emanating towards the ceiling is not useful for providing light to the environment. Accordingly, various types of shades, reflectors, and other adapters were devised in combination with the socket in attempts to provide the desired lighting of the environment.

Later developments led to an incandescent bulb having an internal reflector. In essence, a portion of the inside of the bulb is coated with a reflective material so that light from the filament is emitted in one direction and light emitted in the other direction is reflected such that it too emanates in the desired direction. The need for a separate reflector to redirect the light was eliminated by making the bulb into a directional light source. These are commonly known today as R and PAR type bulbs.

Both A-type, PAR, and R types of bulbs are used in ceiling mounted lighting fixtures. The typical ceiling mounted, recessed lighting fixture is comprised of a frame with some means for being secured to the structural supports of the ceiling, generally wood joists. In a typical installation where ceiling tiles or gypsum boards form the ceiling structure, the frame of the lighting fixture includes holes or brackets through which fasteners are used to securely position and attach the fixture to the joists supporting the ceiling. In the so-called hung, drop, or suspended ceiling installations, a metal gridwork is suspended in spaced relation to the overhead structure. In this environment, the frame of the lighting fixture is provided with guideways or similar means for interconnection with the grid components for supporting the fixture at a desired position on the grid. With these typical ceiling installations, the installer has access to the structural members from which the ceiling is hung and is readily able to attach the lighting fixture to those structural elements.

Depending upon building codes and architectural needs and desires, the ceiling environment may be insulated or non-insulated (referred to as IC or non-IC, "IC" being an abbreviation for "insulated ceiling"). The design environment determines whether the lighting fixture must be an IC or non-IC type of fixture for electrical and thermal safety considerations. A ceiling that is insulated will retain heat generated by a bulb in the lighting fixture. Accordingly, the fixture and its vicinity can become quite hot. An IC fixture, because it is designed to operate at higher temperatures found in an insulated ceiling, is used in an insulated ceiling and also can be used in a cooler, non-IC environment. A non-IC fixture can be used safely only where insulation is not present.

Another important aspect of the propriety of an IC or non-IC design for the specific lighting fixture application depends upon the bulb used in the fixture. Use of an improper type or wattage of bulb can create hazards, such as a temperature higher than the fixture (and possibly the insulation) is able to accommodate for the specific environment. As will be described in more detail later, conventional lighting fixtures include a partial reflector that obfuscates or otherwise covers the instructions for which type of bulb is appropriate. Unless these instructions are readily visible when changing the bulb, it becomes more likely that one might inadvertently use an improper bulb, creating a potentially dangerous condition with respect to overloading the electrical circuitry and/or a thermal condition creating a fire hazard.

Another aspect of this type of fixture is the cost savings that might be achieved by a minimal design. Ceiling mounted, recessed fixtures are very widely used, in virtually every new construction operation, whether for residential or commercial use. Accordingly, significant costs savings may be achieved by reducing the number and/or weight of the components necessary to provide such a fixture.

Yet another problem with prior art devices is caused by the rigidity of the frame. Although the joists or other ceiling structure to which the lighting fixture is attached are intended to be orthogonal with the plane of the ceiling, a slightly sloped ceiling or installation of the device at a slight slope will prevent the optics from being as desired. The prior art fixtures have a rigid, unchangeable geometry, and so must be mounted with particular care towards their relationship to the ceiling; such customized installation is rare and somewhat contrary to the intended use of mass-produced, easily installed lighting fixtures.

Additionally, known recessed lighting fixtures are typically installed in hung ceilings and are electrically connected via a junction box located within the ceiling. The fixture's housing and accessories are usually, permanently installed within the ceiling structure. Installation of such fixtures necessitates obtaining access to awkward sites within the ceiling for electrical connections between the junction box and the lighting fixture. The junction box is usually attached either to the beams or other support structures within the ceiling or attached directly to the fixture's housing.

With currently available designs, installation and wiring of both the fixture and the junction box becomes a difficult process because of limited space within the ceiling due to the presence of thermal insulation, electrical wiring and other conduits. Also, any wiring modifications or changes require that part of the ceiling be temporarily removed to allow access to a junction box which, in many cases, is mounted at an inaccessible position within the ceiling.

Even in cases where the junction box is directly attached to the housing, the entire fixture has to be dismounted to make wiring changes when there is limited free space immediately surrounding the housing. Under such circumstances, temporary removal of the ceiling or portions thereof are necessary.

Various means of attaching a junction box to a light fixture housing are known in the art, but none allow for a releasably mounted junction box which can be installed even after the housing has been mounted into the ceiling. When using known attachment means, the initial installation of the housing requires that sufficient temporary ceiling entry space be created to insert both the housing and the associated junction box assembly into the ceiling. These attachment means also require that the entire lighting fixture be removed from the ceiling prior to making any wiring changes.

Furthermore, where space limitation is not a problem and the junction box is permanently attached directly to the fixture housing, the configuration of the recessed lighting fixture necessitates the dismounting of all or part of the fixture housing assembly in order to make wiring changes. This also requires the dismounting of the junction box for wiring modifications.

In essence, known devices have a number of deficiencies regarding ease of installation and access thereafter, safety, and cost of manufacturing. A simpler or more efficient fixture design would not only facilitate installation, but likely would also save manufacturing costs by reducing the number of individual component parts and/or the weight of materials used.

OBJECTS OF THE INVENTION

Accordingly, it is an object of this invention to provide a ceiling mounted lighting fixture that is easy to install.

Another object of this invention is to provide a lighting fixture having improved optics and to avoid optics which are compromised due to the installation procedure. A more specific object of the present invention is to provide the desired optics even where the fixture is not installed parallel with the ceiling, or where the ceiling has a slight slope.

Yet another object of this invention is to provide a fixture having a reduced number of parts, resulting in a savings in the cost of construction of the fixture.

Still another object of the invention is to provide a junction box, preferably associated with the novel lighting fixture, that facilitates examination by a building inspector prior to or after the final stages of interior construction.

It is another object of the present invention to provide a novel recessed lighting fixture equipped with a junction box which can be rewired, have new cables introduced therein, and allow access to the interior of the junction box, all without having to remove the housing from the ceiling or remove part of the ceiling.

It is yet another object of this invention to provide a lighting fixture which allows a junction box to be installed or removed from the lighting fixture housing without having to remove part of the ceiling or to remove the fixture housing from the ceiling.

It is still a further object of this invention to provide a recessed lighting fixture which has a design that is particularly useful in areas with very little space for mounting the fixture's junction box.

These and other objects will be apparent in the following description.

SUMMARY OF THE INVENTION

In general, the present invention provides a lighting fixture comprising a housing, a full reflector, and a lamp socket arranged within the reflector. The inventive fixture preferably also includes a junction box and wiring means. The housing is provided for supporting the lighting fixture. The full reflector is selectively positionable within the housing for reflecting light from the fixture. The socket for accepting a light bulb is selectively attachable to the full reflector and operably associated therewith so that a bulb accepted in the socket is disposed within the reflector with the desired optical relationship to the reflector.

In one embodiment, the junction box comprises a top wall, a bottom wall, two side walls depending between the top wall and the bottom wall, a back panel and a door. The top wall, the bottom wall, the two side walls, the back panel and the door define the interior space of this junction box embodiment. At least one wiring conduit is disposed in at least one of the walls for accepting wiring into the interior of the junction box. A wiring clip is disposed within the interior space, and the wiring clip is used for retaining wiring in an abutting relationship with at least one of the walls, and a ridge extends into the interior of the junction box from the wall against which the wiring abuts.

In another embodiment, the junction box comprises a top wall with a first, free front edge and a first back edge, with the first back edge joined to a back wall. This junction box has further a bottom wall having a second, free front edge and a second back edge, with the second back edge also being joined to the back wall. The top wall, the bottom wall and the back wall defining an interior space. A first side wall having a third, free front edge and a third back edge is joined to the back wall with the third back edge, and a second side wall having a fourth, free front edge and a fourth back edge is joined to the back wall by the fourth back edge. At least one of the third or fourth back edges of the side walls are flexibly joined to the back wall so as to permit flexing of at least one of the side walls towards and away from the interior space. A front panel is disposed opposite the back wall and is releasably mounted to the junction box at the first and the second free front edges of the top and bottom walls.

BRIEF DESCRIPTION OF THE DRAWINGS

FIG. 8 depicts a perspective view of another embodiment of the housing and the support bars.

FIG. 9 depicts a cross-sectional view through one of the support bars along line 9—9 as shown in FIG. 8.

FIGS. 11A-B depict cross-sectional views of the inventive fixture as installed in a ceiling, while

DETAILED DESCRIPTION OF THE INVENTION

The lighting fixture of the present invention generally includes a housing which accommodates a socket and a full reflector for a bulb disposed within the socket. A bulb disposed in the socket accommodated within the full reflector is provided with proper reflecting optics to the extent that all of the light from the bulb will emanate from the reflector, with virtually none being lost. Another aspect of lighting optics, the spatial relationship between the fixture and the environment to be illuminated, is assumed to be near optimal if the room walls, floor, and ceiling all form an essentially perfect box. Because actual conditions are usually suboptimal, the reflector of this invention is separately positionable and/or rotatable within the housing, thereby allowing for the lighting of the environment as intended regardless of the structure of the ceiling. The novel lighting assembly of this invention may also include a junction box mounted directly to the housing for safeguarding electrical connections between the fixture and an external power supply. The present fixture may also include means for mounting the housing to the supporting structure of a ceiling, preferably by using support bars releasably coupled directly to the housing and permanently attachable to joists for selectively and securely mounting the housing.

Figure 1:
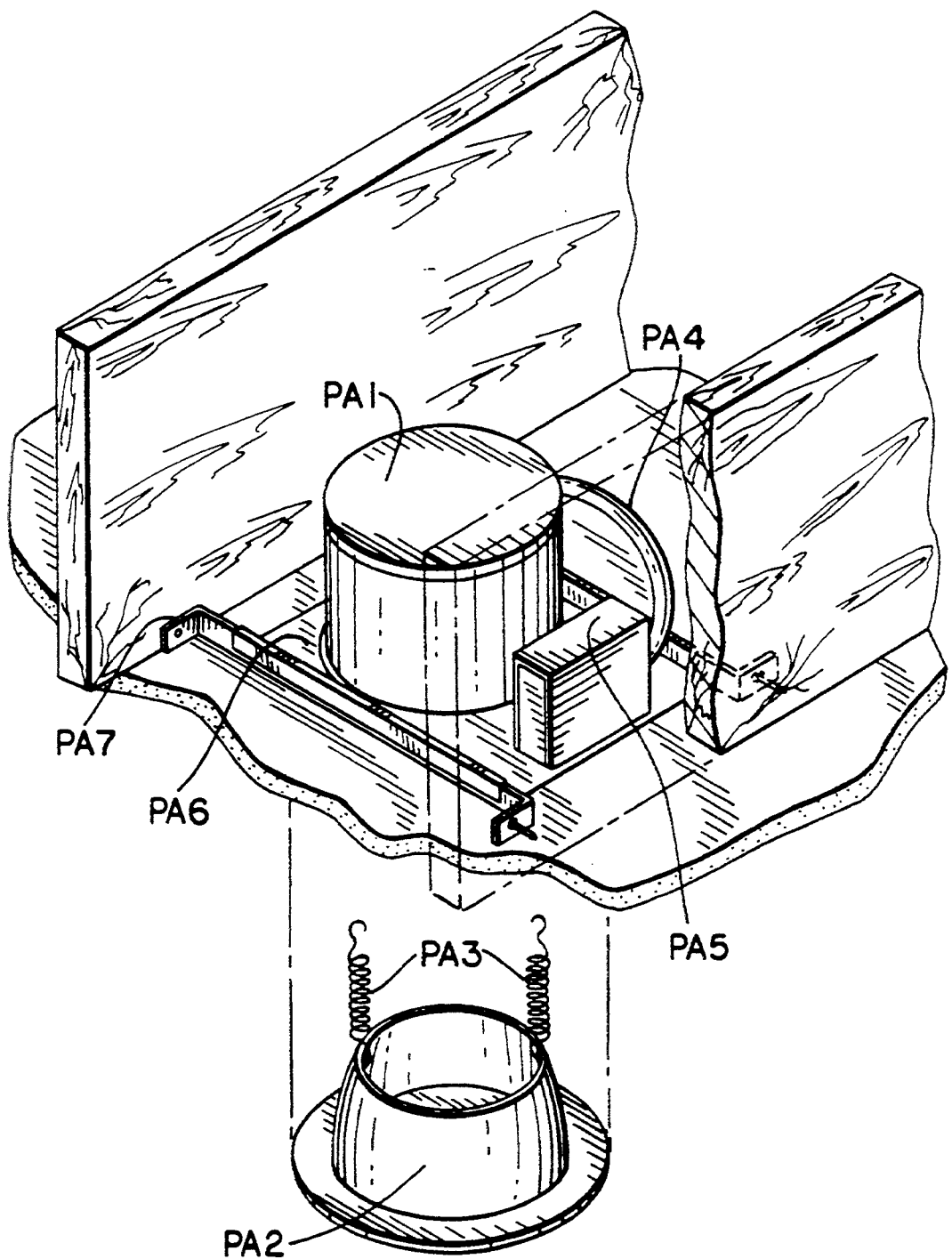
FIG. 1 depicts a perspective view of a prior art lighting fixture.

In order to gain an appreciation for the advantages of the inventive fixture over the prior art, an understanding of the prior art devices may be gained with reference to FIG. 1. As mentioned in the Background section, prior art devices generally comprise a housing PA1 defining an aperture and having a socket at the housing end opposite the aperture. To improve the illumination qualities of the fixture, the prior art utilizes a partial reflector PA2 which attaches to the housing within the aperture by means of helical springs PA3. The socket is connected by wiring PA4 to a junction box PA5 in which a splice to external wiring is housed (not shown). Both the housing and the junction box are supported by a common frame PA6 which is connected by supports PA7 that span the joists of the ceiling structure. The prior art thus requires a significant amount of frame material to secure the fixture to the ceiling structure and to support the junction box. The excessive material used to provide the prior art frame significantly increases material costs and thus also increases the cost of the fixture. The prior art also requires that the socket be fixedly positioned with respect to the housing. Although some improvement in optics is achieved with the partial reflector PA2, the optics are easily compromised by imprecise installation due to the general rigidity of the fixture. Attachment of the partial reflector is also somewhat cumbersome because there is limited clearance for the helical springs to be attached within the housing by hand.

Figure 2:
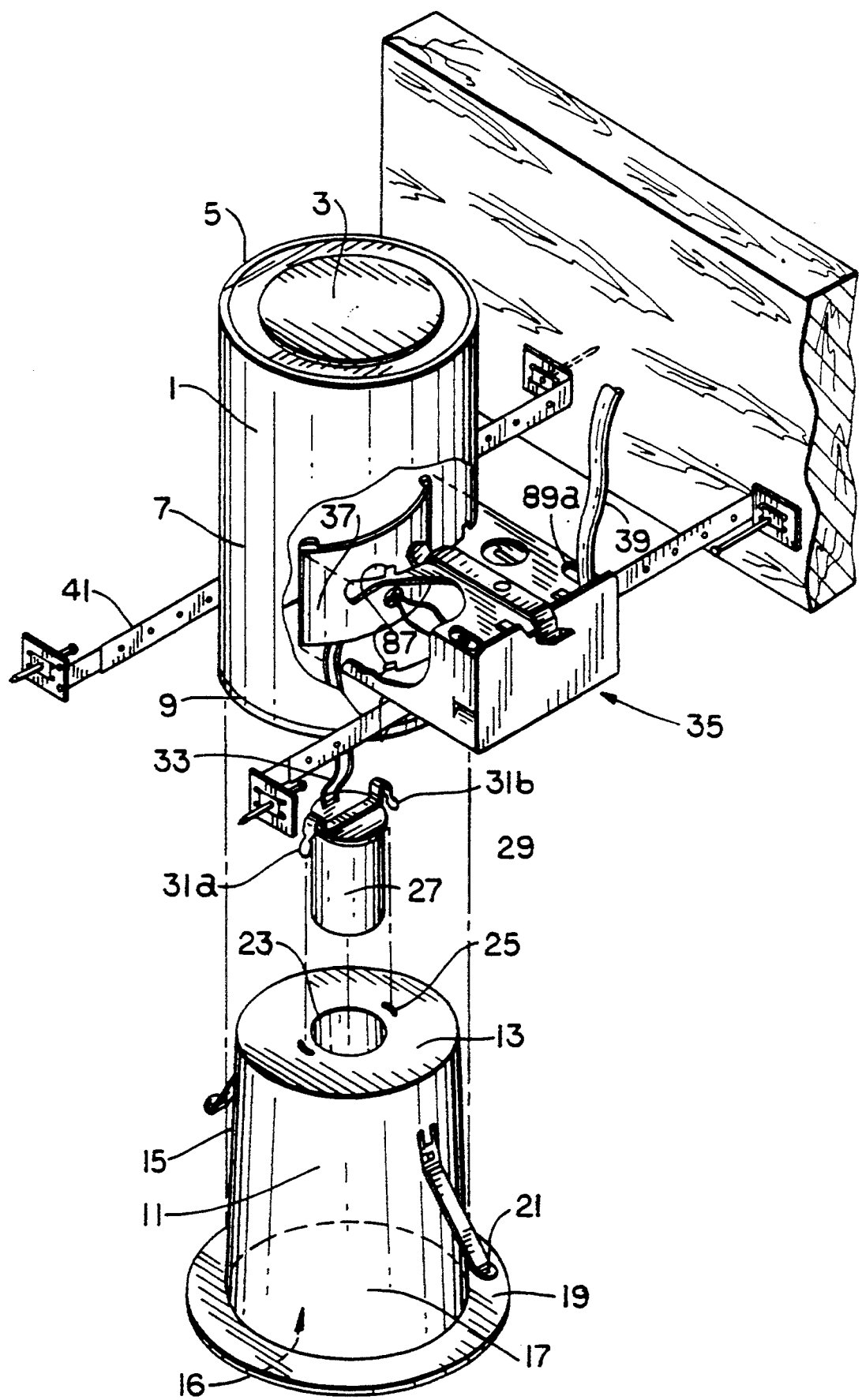
FIG. 2 is a partially exploded perspective view of the novel fixture showing the housing, junction box, socket, reflector, and support bars.

In contrast, the present lighting assembly, as illustrated in FIG. 2, comprises generally a housing 1 having disposable and positionable therein a full reflector 11. A socket 27 is attached directly to the full reflector 11 and the socket and reflector are operably associated such that a bulb disposed in the socket is accurately contained within the reflector. Attached directly to the housing 1 is a junction box 35 for electrical connections between the socket 27 and an external power source. Thus, the socket, reflector, and junction box can all be connected to the housing such that an integral assembly is created. Lastly, this integrated assembly can be attached to the ceiling structure by a pair of support bars 41 which also are connected to the housing by leaf springs.

In further detail with reference to FIG. 2, the lighting assembly comprises a fixture housing 1 having a top portion 3 attached at a top rim 5 to a housing wall(s) 7. Thus, a non-cylindrical geometry for the housing may have more than one housing wall, whereas the preferred cylindrical geometry shown will provide a housing having only a single, continuous side wall. The housing wall terminates at a bottom rim 9. The top rim 5 is preferably made by rolling the top portion 3 over onto the housing wall 7, as in a conventional can used for food packaging. Likewise, the bottom rim 9 is preferably provided by rolling the wall 7 back onto itself, thereby eliminating sharp edges that could injure the person installing the fixture or could damage wiring insulation.

The inventive lighting assembly includes, disposed within the housing 1, a full reflector 11, which includes a reflector top 13 and at least one depending reflector wall 15 defining an internal reflector volume 16. The reflector wall 15 defines an aperture 17 through which light emanates. At the portion of the reflector wall 15 defining the aperture 17 is a reflector trim 19 disposed generally orthogonally to the reflector wall. Disposed on the outside of the reflector wall (as opposed to the interior volume 16) is at least one reflector retaining spring 21, although multiple springs can also be used. Preferably the retaining spring 21 includes multiple leaf springs disported symmetrically or equidistantly around the reflector wall. The leaf-type reflector retaining springs shown in the Figures abut the interior of the housing wall to selectively secure the reflector within the fixture housing. Additionally, the springs allow the reflector to be disposed at various desired axial depths within the cylindrical housing and/or at various orientations angled from the axial extent of the housing (axial being essentially along the axis of the cylindrical reflector). Other suitable means for selectively securing the full reflector can include a non-conductive, close fitting ring or annulus arranged on the outside of the reflector wall having a geometry effective to frictionally engage both the full reflector and the inside of the housing.

The novel lighting assembly also includes a socket 27 adapted for receiving a lamp or light bulb. Disposed in the reflector top 13 are a socket receptacle 23, shown as a circular opening, and attachment slots 25. The attachment slots are for attaching a socket 27 to the reflector. The socket shown includes a socket clip 29 having two ends which terminate respectively at socket tabs 31a and 31b. The socket tabs 31a/b are operably associated with the attachment slots 25 in the reflector top. The cylindrical socket 27 is thus adapted to fit within the circular socket receptical 23, the combination of the slot and tabs being a preferred means of attaching releasably the socket to the reflector. Other means for attaching the socket to the reflector may be utilized, the preferred means being those which allow releasable rather than fixed attachment of the socket to the reflector. The embodiment shown facilitates socket attachment to and removal from the reflector by manipulation of the socket tabs from within the reflector volume 16, thereby also facilitating removal and/or replacement of the reflector. The socket can be of any conventional design desired depending upon the type of bulb needed for interior lighting; while the typical socket will allow screwable attachment of a bulb, a socket suitable for compact fluorescent or halogen bulbs may be preferred for certain applications. Thus, the socket is releasably attached to the reflector and the reflector is releasably attached to the fixture housing; friction between the leaf retaining springs and housing is the preferred mode of retaining the reflector not only within the housing but also in a desired position within the housing.

As shown in FIG. 2, issuing from the socket is wiring 33 passing to junction box 35 through a junction box back plate 37 where the wiring 33 is spliced to external wiring 39, such as a BX or ROMEX cable for connection to centralized wiring (not shown). The junction box is preferably attached directly to the fixture housing.

Figure 3:
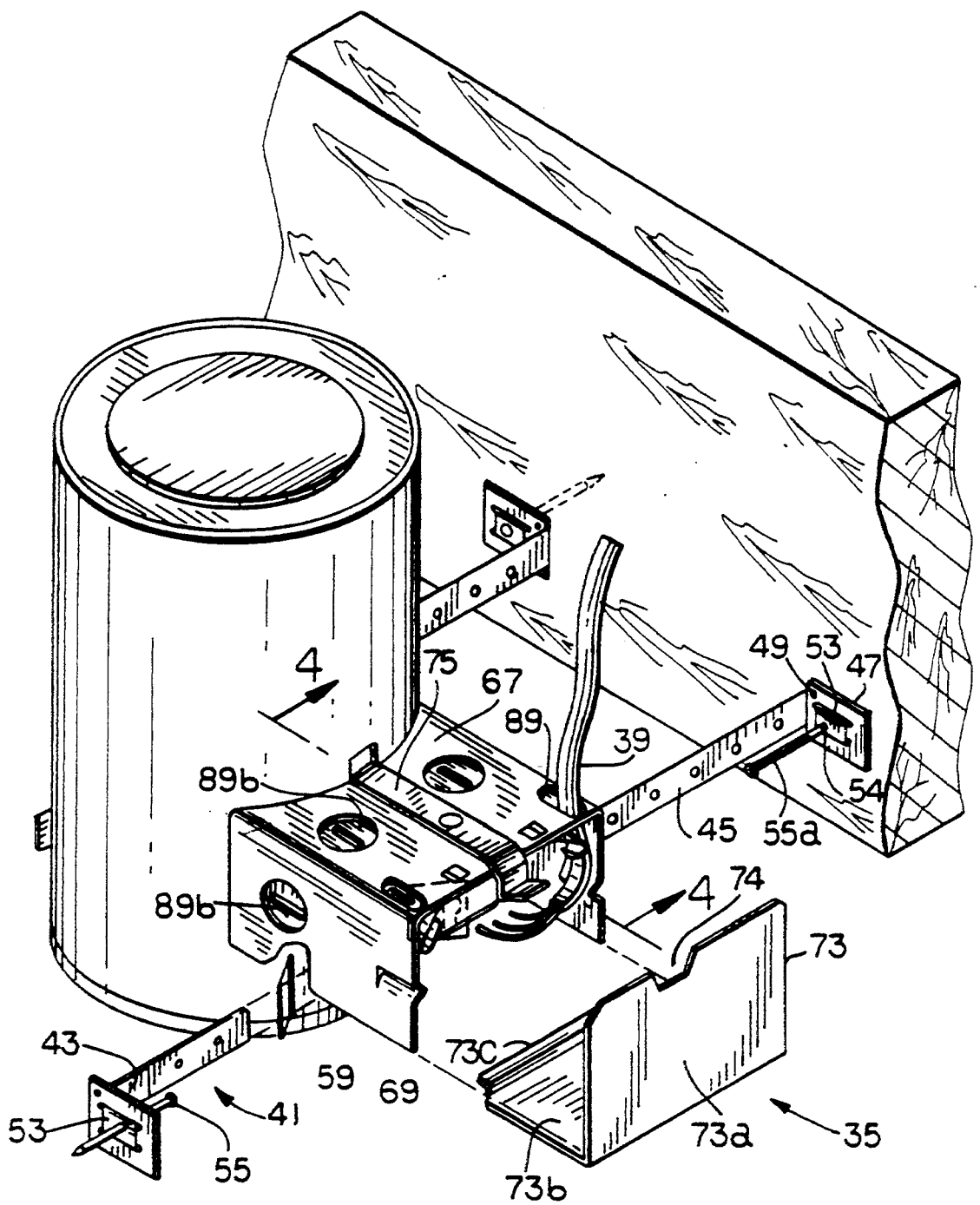
FIG. 3 depicts a perspective view of the housing, supporting structure, and junction box arranged in an assembled configuration.

The novel assembly having a reflector, socket, and junction box integrated with and supported by the housing is mounted to a ceiling structure. As shown in the Figures, the housing 1 is secured to a ceiling structure such as spaced apart joists by support bars 41. The support bars are attached directly to the housing by means of springs, without any intervening frame as required by the prior art. As variously shown in FIGS. 2, 3, 8, 9, and 10, each support bar 41 has a tongue portion 43 and a groove portion 45 which slidably cooperate to provide a support bar of a length adjustable as necessary for attachment to the ceiling structure. Each end of the support bar includes a flange 47 for direct attachment to the ceiling structure. One means of such direct attachment can be by nailing through nail holes 49 which are strategically provided through the flange 47 and/or by nailing a nail tab 51 integral with the flange into the joist. An especially preferred embodiment of the flange, as shown in FIG. 3, includes a retaining nail bridge 53 having a hole 54 with a diameter smaller than the diameter of nail 55, whereby nail 55 can be pressure-fit into the hole and held as shown at 55a. This design facilitates attachment by providing the device with a nail strategically positioned where desired without the person installing the fixture having to use another hand to locate and then hold a nail in place; that is, the bars are manufactured with a nail positioned in each flange. Preferably, the retaining nail bridge 53 is bowed towards the support bar to provide a recess in which the tip of the nail resides until the nail is hammered. Thus, the retracted nail does not extend beyond the end flange, and final adjustment of the bars is not impeded by the point of the nail digging into the mounting surface. Accordingly, the installer is also protected from the sharp nail tip during installation. The curved nail bridge also facilitates pulling out the nail, if required, by positioning the nail head for engagement with the claw of a hammer. The tongue-and-channel construction of the support bars provides increased strength and variable length without adding additional material. The support bars may also be adapted for attachment to ceiling runners as described in U.S. Pat. No. 5,045,985, incorporated herein by reference.

The channel portion 45 of the support bar includes a plurality of equally spaced holes 57, and the side of the tongue adjacent the holes preferably has a nub (not shown) which frictionally engages the holes to prevent the tongue 43 and channel 45 portions from sliding apart without manipulation by the installer. The cooperation of the nub with the spaced holes provides a self-locking arrangement for the bars. Thus, the tongue and channel portions of the support bar may be slidably positioned in discrete or continuous lengths.

Figure 10:
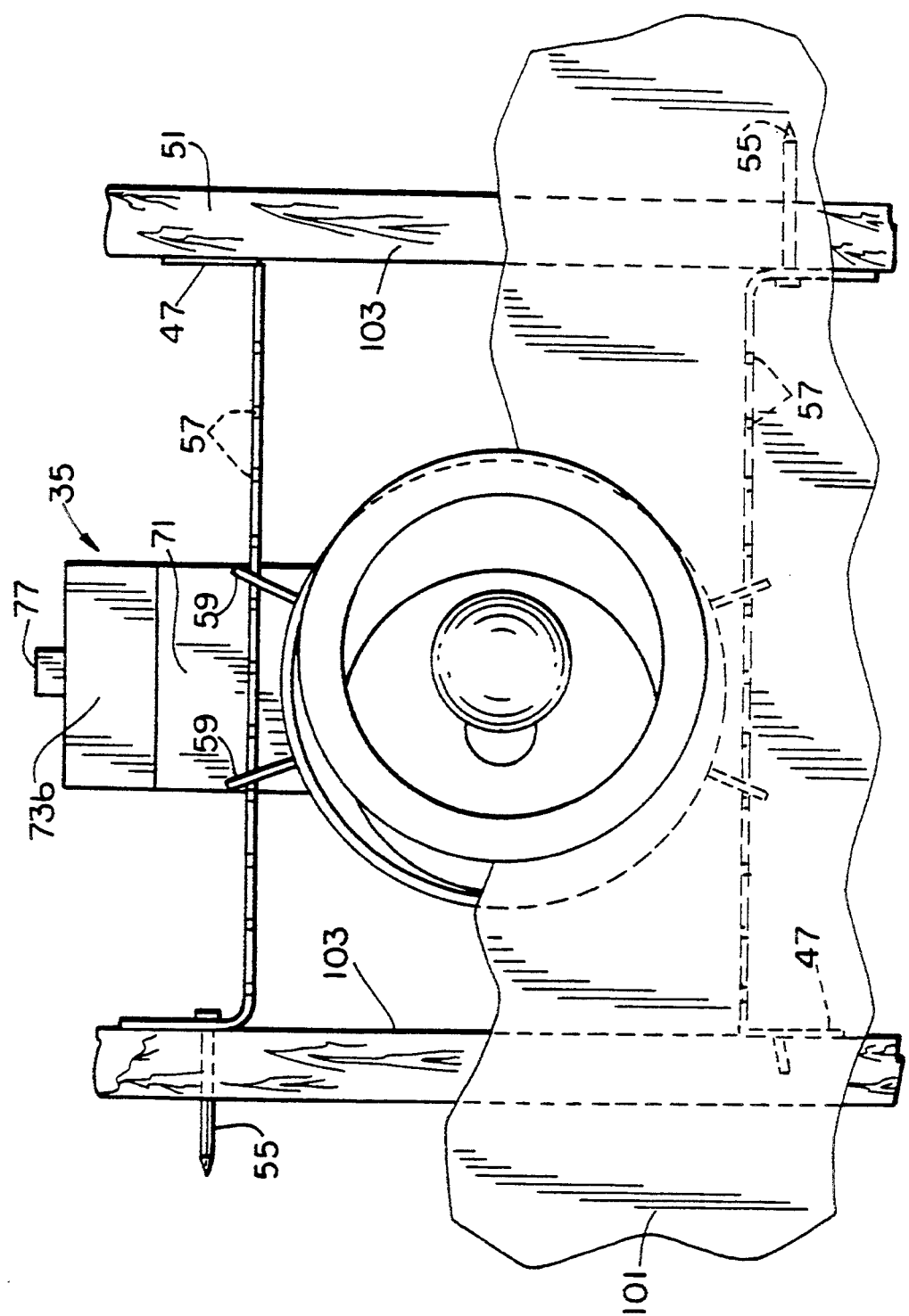
FIG. 10 depicts a view from underneath an installed fixture showing how the housing orientation can vary while the optics remain the same; this view also depicts another method of attaching the housing to the ceiling structure.

The spaced holes 57 in the channel portion of the support bar 41 can be used to provide a support composed of only the channel portion disposed between joists that are spaced closely together, for example, closer than when the support bar is slideably contracted to its smallest length. Each spaced hole in the channel portion acts as a score point at which the channel portion can be bent to accommodate the closer spacing of the joists. The channel portion is bent with the resulting bent portion being positioned flush with the joist. The spaced holes on the bent portion function as nail holes for securing the support bar. Thus, as shown in FIG. 10, the supporting means is effectively only the channel portion of the support bar, which is bent as shown to provide a bar of the desired length. A nail 55 can be hammered through the hole 57 to secure the bar at the bent portion of the channel, and securement at the other end can be accomplished using the flange structure provided, for example, by using the nail tab 51.

Figure 4B:
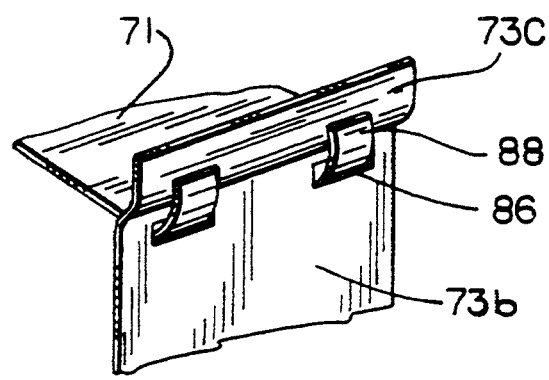
FIG. 4B depicts one embodiment of a junction box door.
Figure 4A:
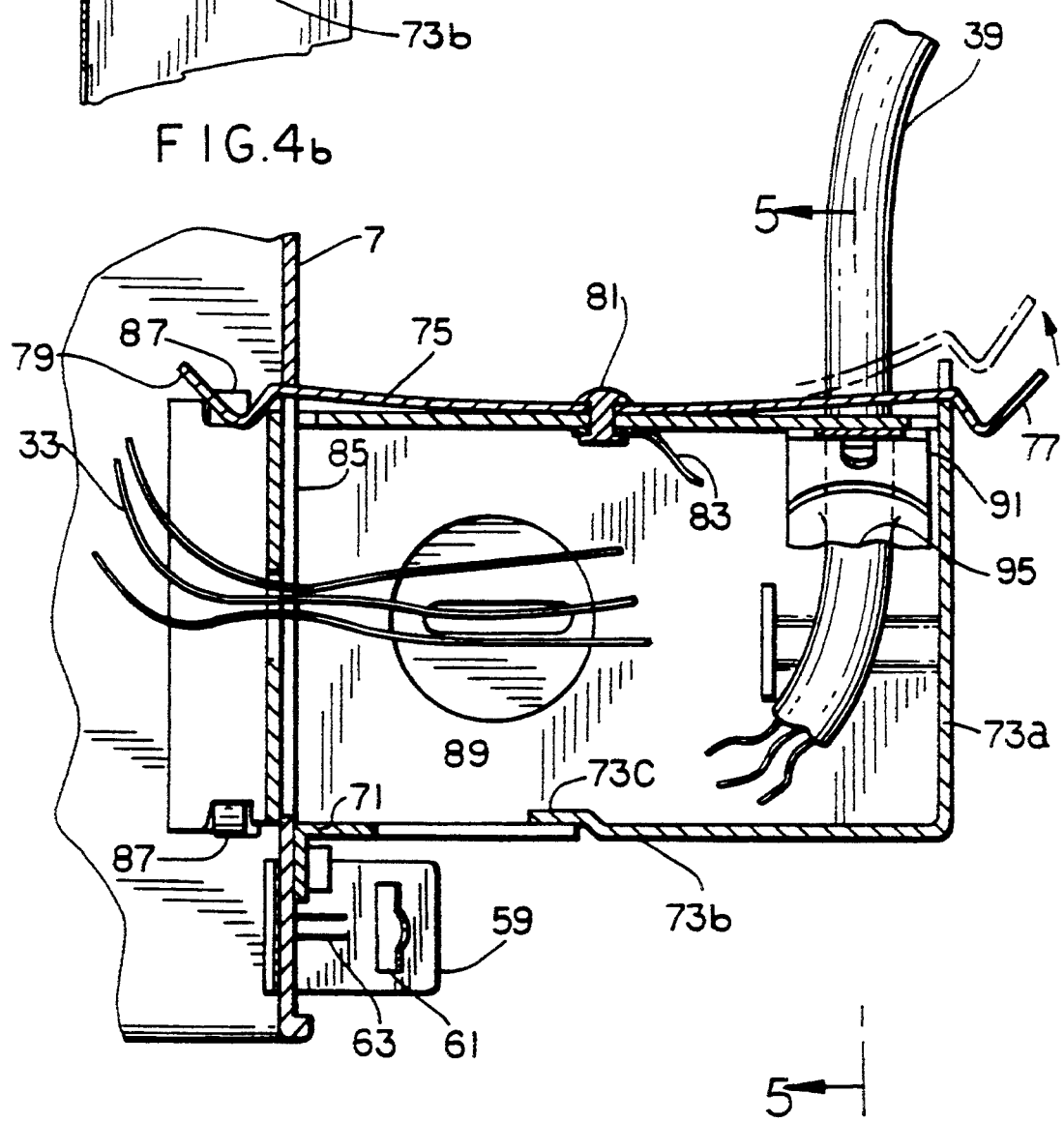
FIG. 4A depicts a cross-sectional view of the junction box transverse to the housing taken along line 4—4 of FIG. 3.
Figure 5:
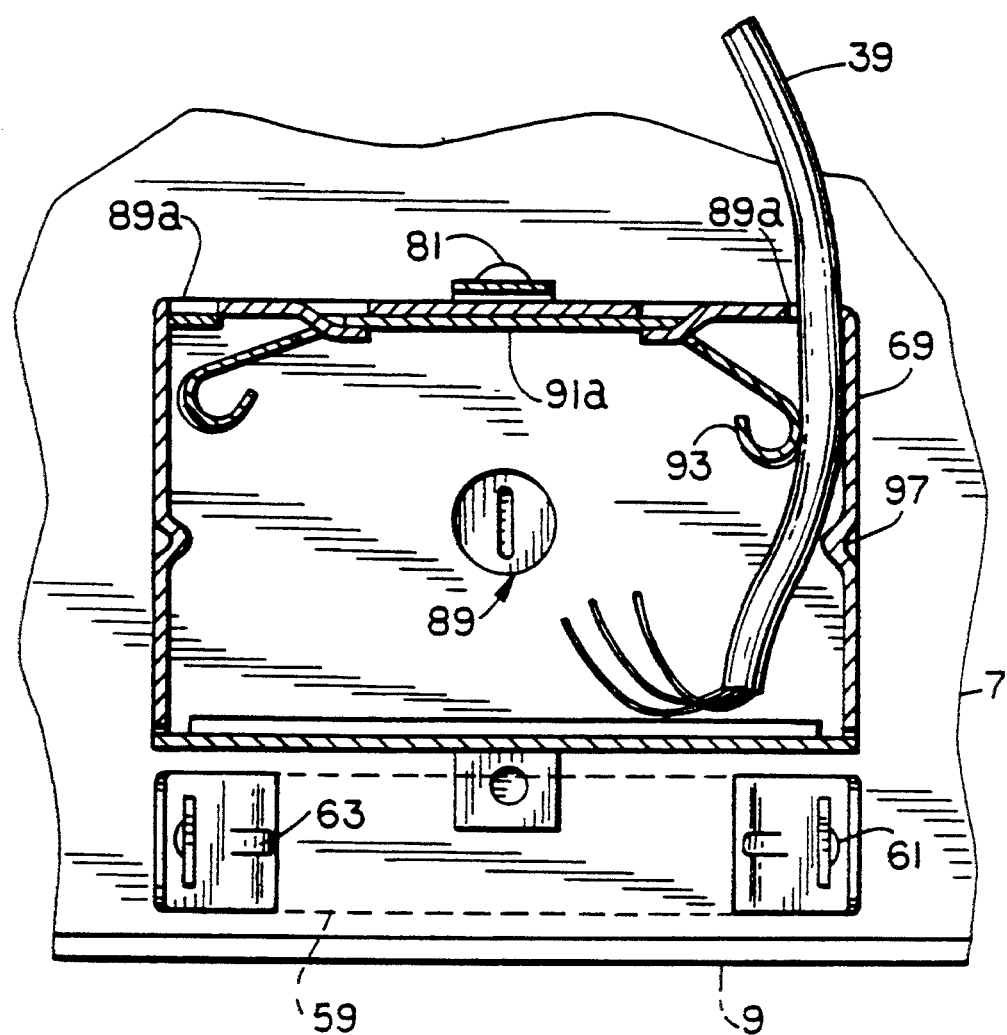
FIG. 5 depicts a cross-sectional view of the junction box essentially parallel with the extent of the housing taken along line 5—5 of FIG. 4A.

As shown in FIGS. 3, 4A, 5, and 8, each support bar 41 is attached to the housing 1 by a retaining clip 59, preferably a symmetrical leaf having a support bar passage 61 in each end. The support bar 41 passes through both passages 61 of the clip 59, as shown in FIG. 8. Referring also to FIGS. 4A and 5, proximate from each passage is a securement tab 63, generally a tongue stamped out from the clip. The retaining clip 59 is slipped through the pair of clip passages 65 in the housing wall 7. As shown, a single clip can be positioned through the pair of clip passages and the securement tabs 63 bent towards or away from each other (i.e., out of the plane of the clip) to engage the housing, thereby securing the clip to the housing by preventing the clip from being slid through either clip passage. The retaining clip instead may be fixedly attached to the housing wall by a rivet, although this would require more material and an additional manufacturing operation. The retaining clip is essentially a type of leaf spring which frictionally engages and retains the support bar in a desired position. In operation, the ends of the clip where the passages are located are pressed towards each other to release the frictional engagement (by bringing the passages 61 into alignment) and to allow the support bar to be slidably positioned in the passages. The ends of the clip are then released to frictionally re-engage the support bar. Additional strength is provided to the general support structure by arranging the support bar and the retaining clip so that the flat surface of the tongue and channel portions is colinear with the downward force of the fixture; that is, the weight of the lighting fixture is supported by the thicker portion of the support bar rather than normal to the flat surface.

Turning to FIGS. 3, 4A, and 5, the junction box 35 includes a top portion 67, depending sides 69, a bottom portion 71, and a door 73. The junction box door 73 includes a door outer side 73a attached essentially orthogonally to a door bottom side 73b. A tongue 73c extends slightly upwardly from the door bottom side 73b and cooperates with the junction box bottom portion 71 to secure the junction box door.

The L-shaped junction box door 73 includes a clip recess 74 for cooperation with a junction box clip 75 disposed on the top portion 67 of the junction box 35; the junction box clip 75 is for securing both the junction box door 73 and the junction box back panel 37. The junction box clip includes two ends, each configured as a retainer to provide a clip or snapping engagement with the door via clip retainer 77 or with the back panel via clip retainer 79. In the embodiment shown, the junction box door includes clip recess 74 for engaging the retainer and the back panel does not include a similar recess; the presence or absence of a recess to facilitate cooperation with the clip retainer is a design choice. The junction box clip preferably is secured by a rivet 81, at which point of attachment a ground wire 83 is preferably connected with the junction box. The junction box is connected to the fixture housing at the junction box passage 85, an opening in the housing wall designed to accomodate the junction box. As shown in FIGS. 2 and 4A, the junction box is held adjacent the fixture housing by the junction box retaining tabs 87 which extend into the housing and frictionally engage the edges of the junction box passage 85 formed by the housing wall 7.

In another embodiment, as shown in FIG. 4B, the L-shaped junction box door includes a plurality of slots 86, preferably two, on the door bottom side 73b just adjacent the tongue 73c. A corresponding number of curved support tabs 88 integral with the junction box bottom portion 71 are spaced therealong to associate with the slots 86, whereby the junction box door may be hinged and hung from the support tabs during inspection.

In various places on the junction box top, side walls, and bottom are disposed pop-out wiring conduits 89 through which wiring can enter and leave the junction box. As shown, these wiring conduits have a longitudal hole to facilitate pop-out by use of a screw driver. In a preferred embodiment, a pair of wiring conduits 89a disposed on the top near the junction box door provide easy access to a wiring clip 91 attached to the junction box top and disposed in the interior of the junction box. This wiring clip is likewise preferably a leaf spring having a terminus 93 at the end of each leaf. Each terminus 93 of the leaf spring is preferable curled to avoid damage to the external wiring insulation. The wiring clip 91 is designed to secure the external wiring within the junction box 35 by frictionally abutting the wiring between the terminus and the side wall. The wiring clip 91 preferably also has a cable channel 95, a central depression along the axial extent of the leaf spring, in which the external wiring 39 can reside, maintaining the secured positioning of the external wiring. Still further, the side wall 69 of the junction box adjacent the conduit 89a includes a retaining ridge 97 which extends into the interior of the junction box. The combination of the leaf spring terminus 93 and the retaining ridge 97 provides a non-linear path in which the external wiring is frictionally held, thereby further securing the wiring. The wiring clip secures the external wiring so that it cannot be moved. If adjustment of the wiring is required, the blade of a screw driver can be inserted in the curled portion of the clip and rotated towards the terminus to bend the clip away from the side wall, thereby releasing the external wiring.

Another embodiment of the junction box according to the present invention is depicted in FIGS. 12 and 13. This embodiment is used with the present lighting fixture or with any other housing in which there is a generally rectangular opening for a junction box. In particular, the junction box 35 shown in FIG. 12 comprises a top wall 121 having a free front edge 123 and a back edge 125, this back edge being attached to the edge of back wall 127. Bottom wall 129 has an analogous free front edge 131 and a back edge 133, the back edge being attached to the back wall. The top wall, back wall, and bottom wall define the interior space of the junction box. Two side walls 135a and 135b each have a back portion 137 which is secured to the back wall; in the embodiment shown, attachment is by a rivet 139. Each of the side walls has a free front end 141.

When attachment of the side wall is made at a single point, as shown in this embodiment, the side wall may have a tendency to rotate about this single point of attachment. To prevent this tendency to rotate, various holes and nubs (not shown), analogous to those discussed above regarding the locking of the support bar, can be provided in the back wall 127 and the back portion of the side wall 137 to reduce this tendency to rotate.

Figure 12A:
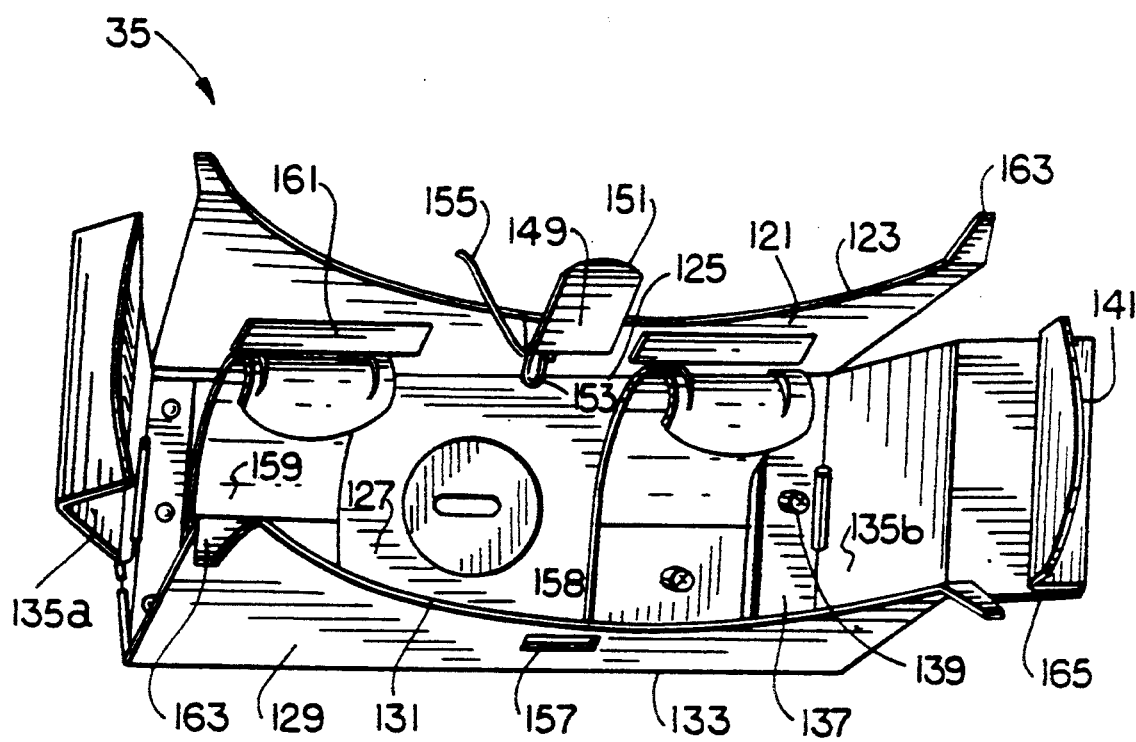
FIGS. 12A-B show a perspective view of another embodiment of the junction box and associated front panel of the present invention.
Figure 12B:
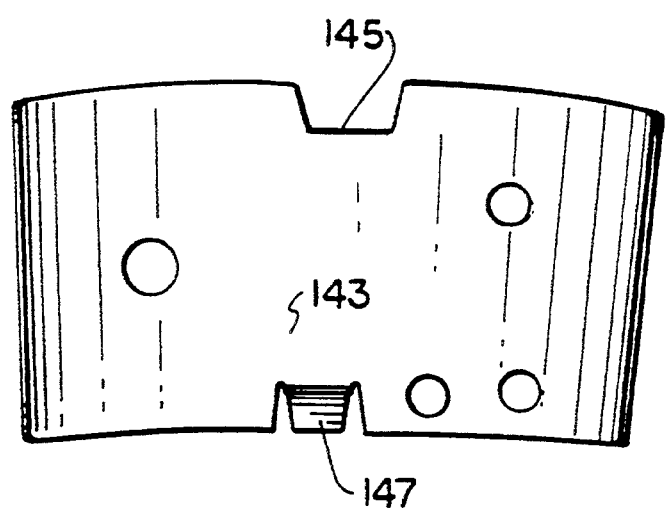

Referring to FIGS. 12A and 12B, the junction box front panel 143 is adapted to cover the opening created by the side walls 135a and 135b and the top 121 and bottom 129 walls. It should be noted, to avoid confusion, that in this embodiment, the back wall 127 is positioned where the L-shaped door 73 of the previous embodiment was located (See FIG. 4A). The junction box front panel 143 includes a notch 145 and a tab 147 for aligning and securing the front panel to the junction box. In particular, this embodiment of the junction box includes a clip 149 attached to the top wall and terminating in a clip retainer 151 which cooperates with notch 145 in the front panel to secure the front panel to the junction box. The clip can be attached to the top wall by use of a rivet 153. This rivet can also be used as the point of attachment of a ground wire 155. The tab 147 on the bottom edge of the front panel 143 cooperates with a slot 157 in the bottom wall 129 to align, position, and retain the front panel closed. In operation, the front panel is secured by first inserting the tab 147 of the front panel into the slot 157 of the bottom wall, and thereafter rotating the front panel to cause engagement of the notch 145 with the retainer 151; the front panel is removed in the reverse fashion, by disengaging the retaining clip from the notch first.

As with aspects of the first-mentioned embodiment of the junction box, the back wall of this embodiment may contain a knock-out 158 (only one of which is shown), and preferably includes at least one wiring clip 159 of the same type as described above. Preferably, the top wall includes a retaining ridge 161 similar to that made in the side wall of the junction box shown in FIGS. 4A and 5. External wiring (not shown) is passed through the opening left after removing a desired knock-out and is retained along the top wall by means of the wiring clip and the retaining ridge.

The attachment of side walls 135a and 135b in this embodiment is by any means which allows repeated flexing of the side walls towards and away from the interior space of the junction box. Thus, at least one, although preferably both of the side walls are provided essentially as leaf springs having a force tending to move in the direction of the arrows shown in FIG. 13A when these side walls are pushed towards the interior of the junction box as it is being attached to the housing.

The present invention includes a method of installing wiring using the present recessed lighting fixture and the junction box according to FIGS. 12A-B and 13A-B, comprising the steps of:
 a) conducting wiring through a first and a second opening of the fixture housing of the present invention, where the first opening is for releasably positioning a reflector, and the second opening is for releasably attaching the junction box;
 b) releasing the reflector from the first opening, and releasing the junction box from the second opening;
 c) performing wiring connections on the released reflector and light bulb socket;
 d) inserting wiring connections to the released junction box;
 e) mounting the junction box back onto the second opening; and
 f) mounting the reflector back onto the housing through the first opening.

Figure 14:
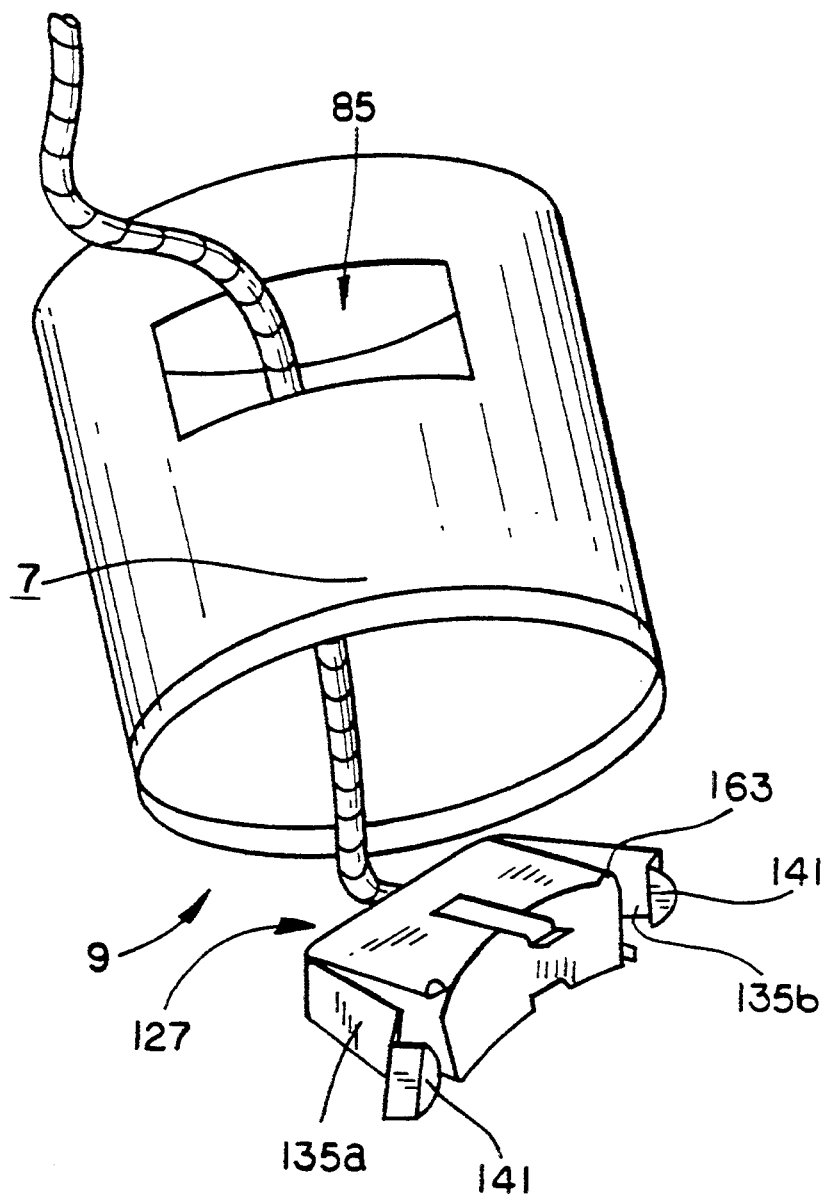
FIG. 14 depicts the installation of one embodiment of the junction box onto the lighting fixture.

Referring to FIG. 14, the spring action of the side walls allows for this novel junction box to be installed in the unique manner described above. More particularly, this junction box is installed by being placed though the bottom opening of the housing over the bottom rim 9 (the first opening) and the back wall 127 inserted through junction box passage 85 (the second opening). This embodiment of the junction box includes tab stops 163 provided at the front corners of the top and bottom walls; as shown, these tab stops are rotated upwards (for the top wall) and downwards (for the bottom wall) to provide a means for positioning the junction box in the passage by stopping the translation of the junction box at a desired position when these tab stops abut the wall 7 of the housing in which the passage is formed. The curvature of the front edges of the top and bottom wall corresponds with the curvature of the junction box front panel which also corresponds to the curvature of the preferred generally cylindrical housing.

As the junction box is being inserted through the junction box passage, the side walls 135a and 135b must be moved towards the interior space and aligned with the side edges of the top and bottom walls to allow the box to fit into the passage. The user can squeeze the free front ends 141 together to accomplish this movement of the side walls towards the interior. The extent of translation of the box through the passage is controlled by the tab stops, which will abut the wall 7 of the housing. After insertion of the junction box, the side walls can be released, whereupon they tend to move in the direction of the arrows in FIG. 13A, and will abut the wall 7 of the housing to retain the junction box in the passage.

Figure 13A:
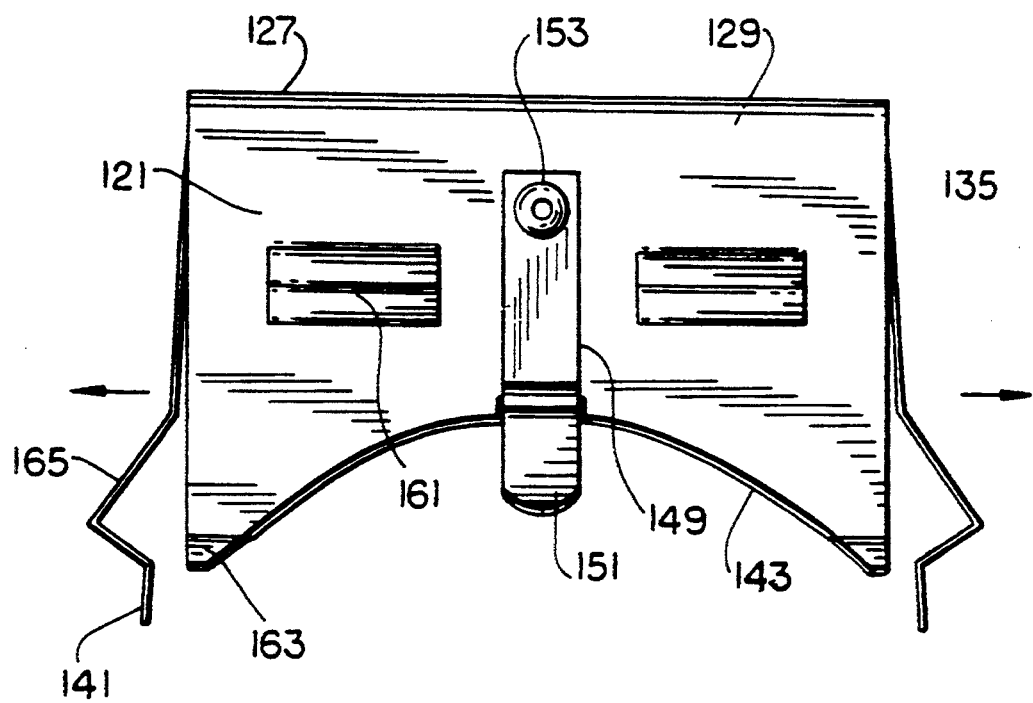
FIGS. 13A-B depict top and side views of the junction box with the front panel attached.
Figure 13B:
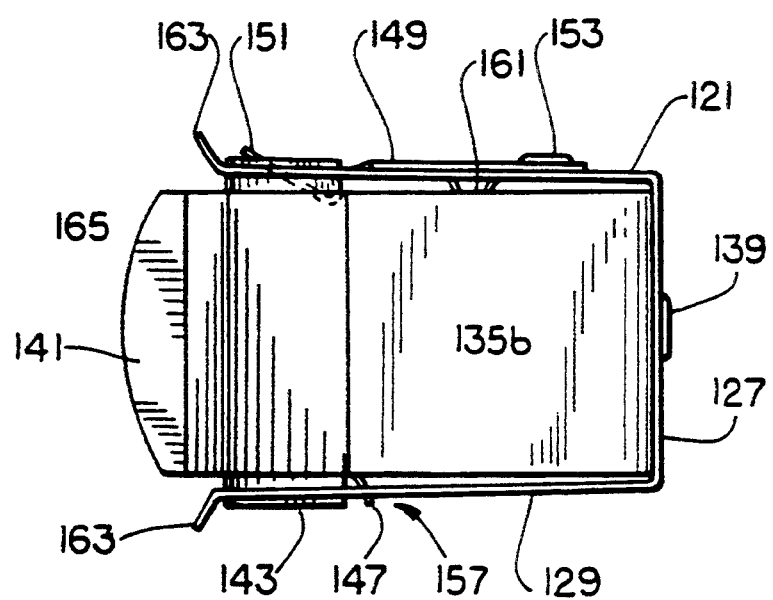

As shown in FIGS. 12A, 13A and 13B, the side walls have a geometry that includes a number of bends 165 by which parts of the side walls are made to protrude away from the interior space. As the tab stops prevent translation of the junction box through the passage towards the back wall, the angled geometry 165 will prevent translation of the junction box in the reverse direction after installation.

Referring back to FIG. 14, removal of the junction box from the housing is accomplished by squeezing the free front ends 141 of the side walls together (after electrical disconnection) and pulling the junction box into the interior of the housing and out through the bottom opening of the housing. It should be clear that there are significant advantages to such a device and method of installation where the junction box can be accessed and installed or disassembled through the same opening in the ceiling as used to install or disassemble the reflector, socket, bulb, and trim.

As shown in FIGS. 12A and 13A, the front edges of the top and bottom walls and the front panel may have an arcuate geometry. Such a geometry is preferably for use with the housing shown in FIG. 2 having a generally cylindrical geometry. These same features can be seen in the junction box 35 and back panel 37 depicted in FIG. 2.

Figure 6:
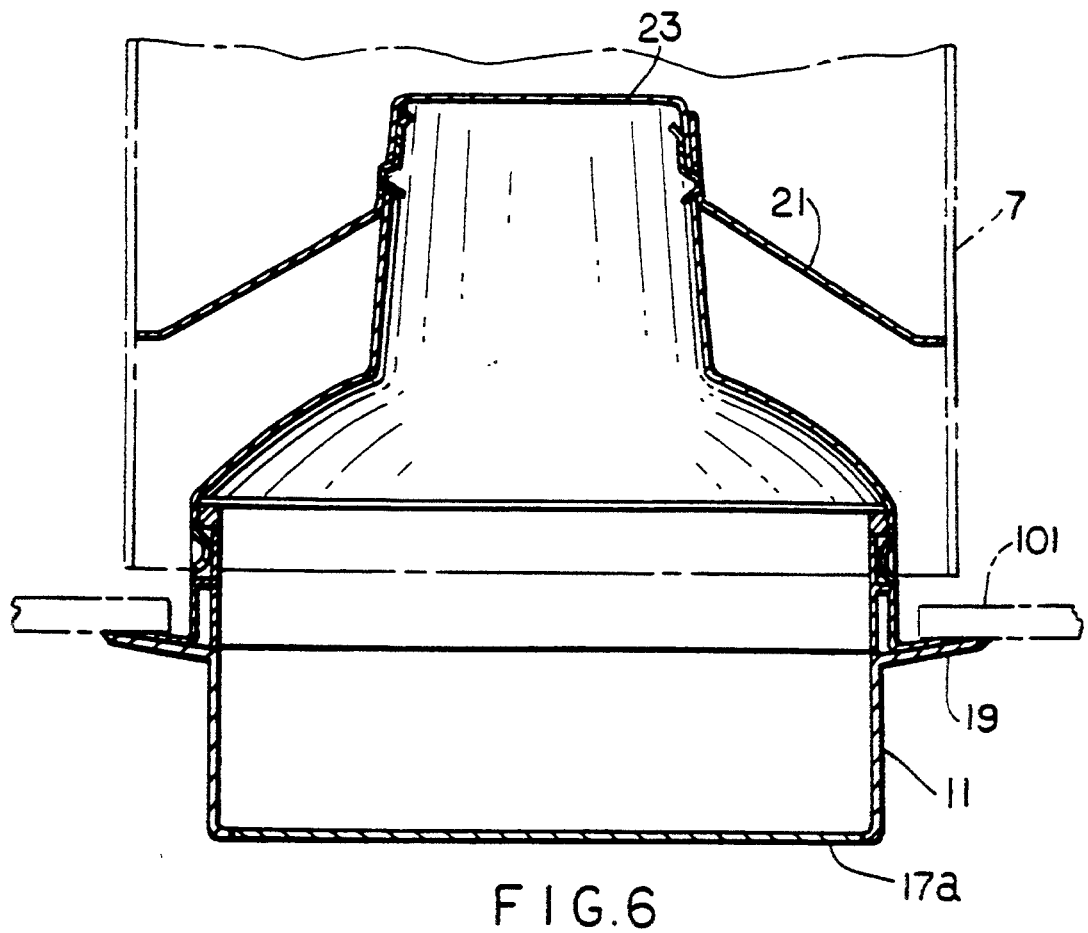
FIGS. 6 and 7 depict cross-sectional views of two different types of reflector geometries suitable for use in the lighting fixture of the present invention; the housing and ceiling are shown as phantoms.
Figure 7:
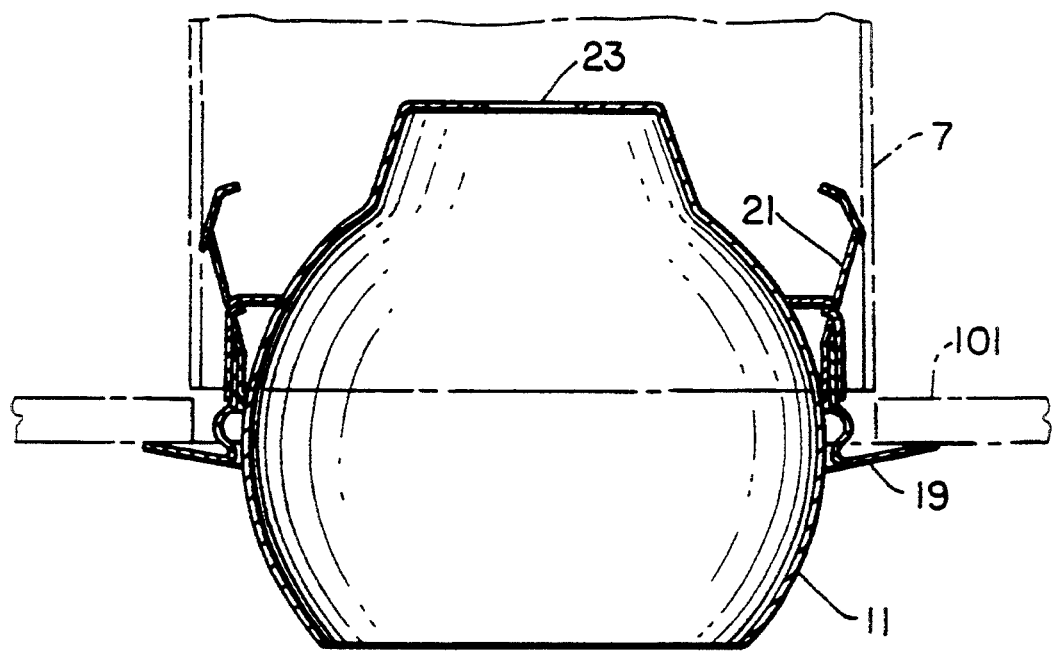

The inventive fixture is especially adapted for using replaceable reflectors. That is, using the same fixture housing, junction box, socket, and support bars, any of a variety of reflector designs and optics can be used to complete the device for the desired interior decor. For example, FIGS. 6 and 7 depict cross-sectional views of two such reflectors. As shown, the full reflector 11 is secured within the housing by friction of the retaining springs 21 against the housing wall 7. The reflector is positioned vertically within the housing such that the trim 19 engages the ceiling 101. These Figures also show how the optics of the present invention are improved over the prior art: whereas the trim 19 was necessary in the prior art to prevent light leakage, in the present invention the trim functions to provide an aesthetically pleasing boundary from the reflector to the ceiling; because of the association between the socket and the reflector that presents the bulb entirely within the reflector, the trim for the present reflectors need not also function to occlude light.

Figure 11A:
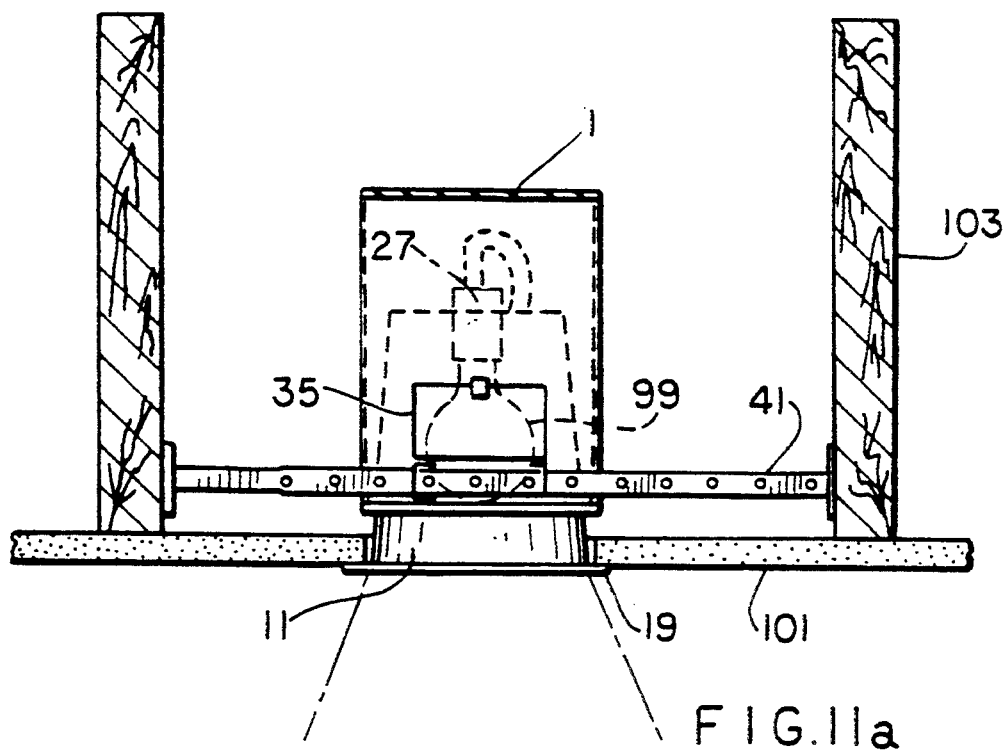

An installed embodiment of the present invention with a phantom light bulb 99 is shown in FIG. 11A, wherein the housing 1 is mounted within the ceiling 101 to joists 103 by the support bars 41. The junction box 35 is attached directly to the outside of the housing. Disposed within the housing is a full reflector 11 having opposite the aperture a socket 27 with the light bulb 99 disposed in the socket. Certain advantages of the present invention now become apparent.

One advantage of the invention is the absence of a rigid supporting frame PA6 between the joists, thereby providing for a means for supporting the fixture with less material. Further, the present supporting means, by not being of a rigid, unadjustable geometry, can be conformed to the spatial orientation of the ceiling structure. Attachment of the junction box directly to the fixture housing also facilitates elimination of the rigid support frame and saves significant material costs by elimination of the frame.

Figure 11B:
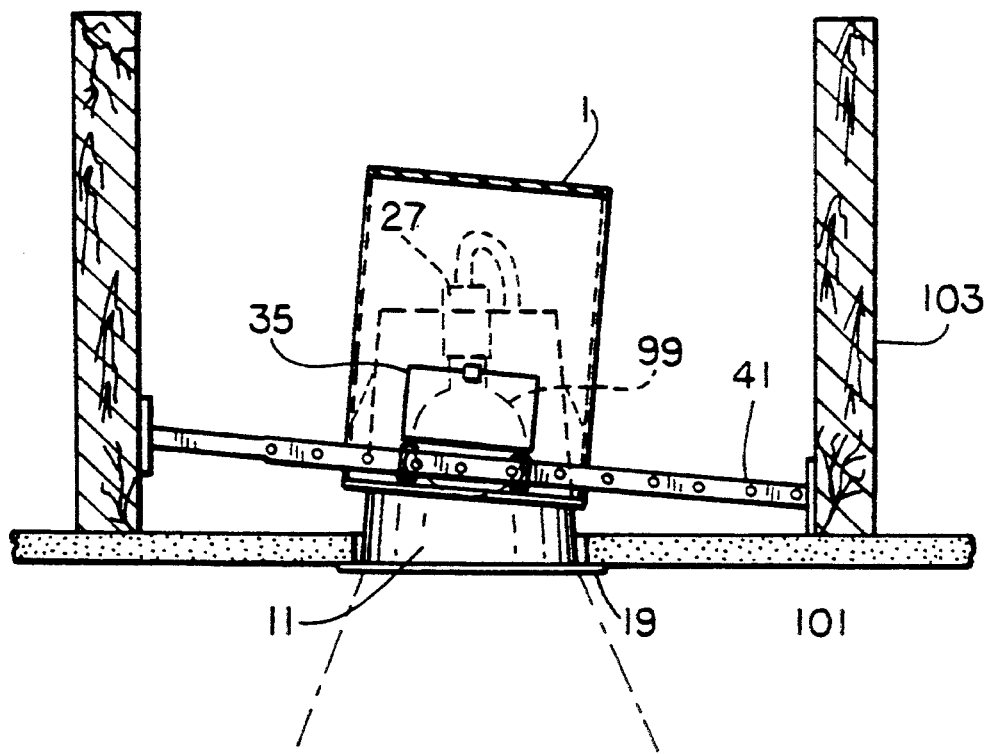

The use of a full reflector 11 in cooperation with a socket 27 which allows the bulb to be disposed within the total reflector provides significant advantages with respect to optics. Use of the partial reflector PA2 as described by the prior art has a number of disadvantages. The partial reflector allows light to leak behind the reflector wall within the housing and appear to the observer in the environment to be leaking out from around the reflector trim; if there is no reflector trim, the partial reflector appears to have a light ring or halo. One method for avoiding this light leakage is to maintain the sides of the reflector above the bulb, but such a solution would increase material costs by creating a double wall comprised of the housing and the partial reflector; such a design would also prevent the reflector from being angularly positioned in the housing because of the close cooperation between the reflector walls and the housing walls. Rather, the full reflector of the present invention in which the bulb is completely disposed not only avoids light leakage, but maintains optimum optics even during non-optimal installation. For example, as shown in FIG. 11B, the device is not installed such that the support bars are essentially parallel with the ceiling, and thus the housing is not parallel with the ceiling; the inventive fixture is secured between the joists, but the housing is thus disposed at an angle to the ceiling. The novel use of a total reflector that can be positioned variably (both angularly and axially) within the housing allows the reflector to be installed with the optics in the proper orientation even though the housing is in a different orientation. Thus, as shown in FIG. 11B, the full reflector 11 and trim 19 are disposed flush with the ceiling 101 even though the remainder of the fixture (the housing and support bars) is disposed fixedly at a different orientation with respect to the ceiling. The ability of the reflector to be positioned at a desired depth within the housing and to be disposed at some angle different from the axial extent of the housing virtually insure that the optics originally desired for optimal lighting of the environment can be provided regardless of sub-optimal installation of the housing.

Figure 11C:
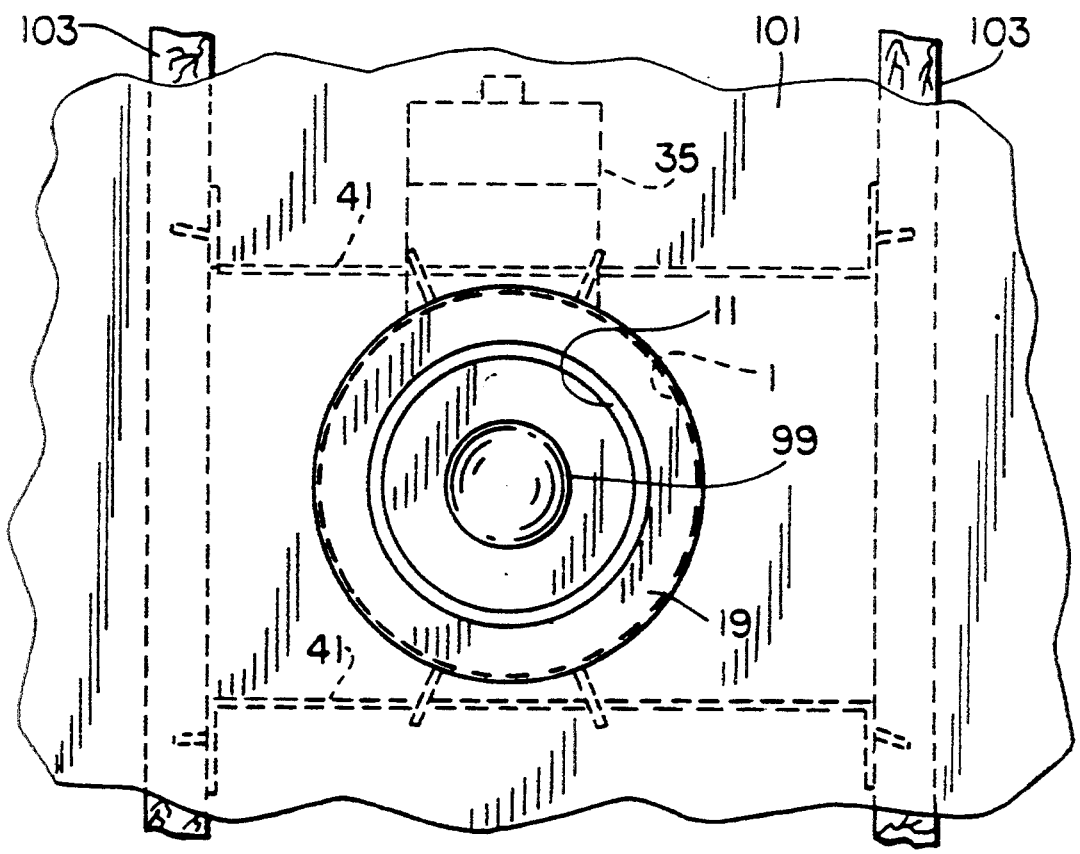
FIGS. 11C-D depict the respective views from underneath the fixtures depicted in FIGS. 11A-B.
Figure 11D:
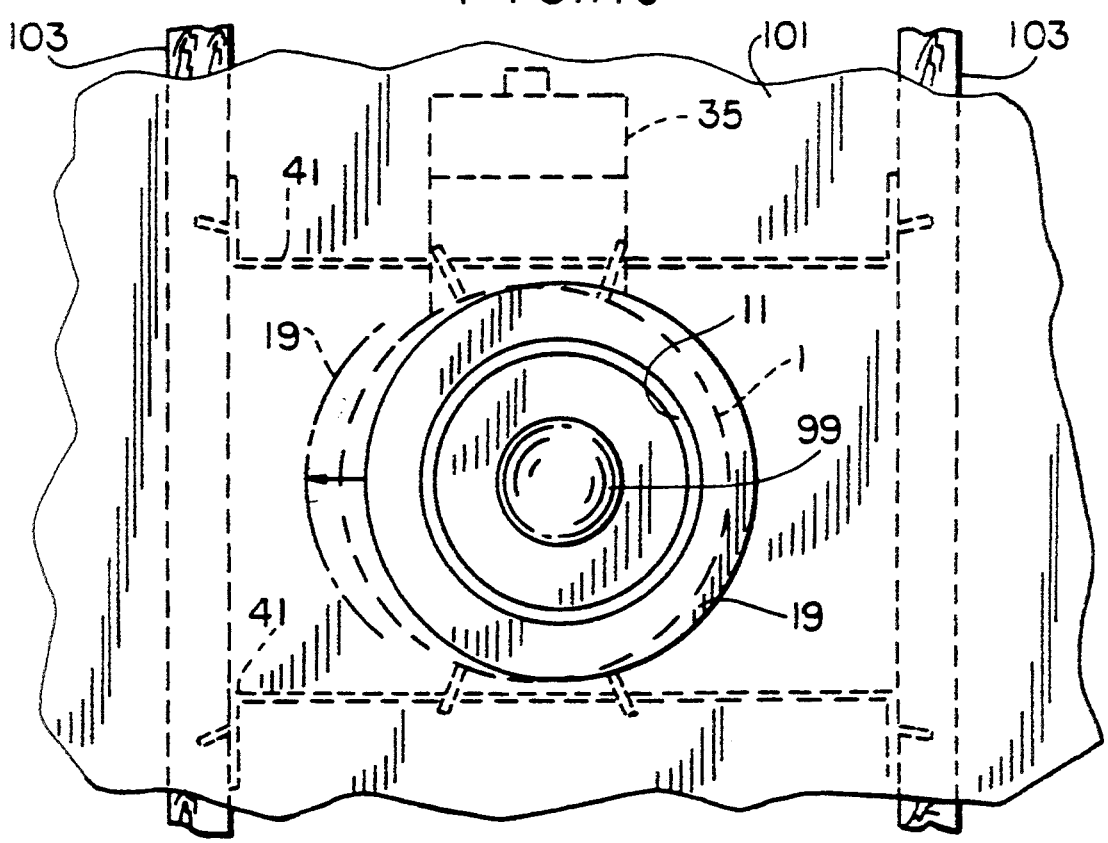

FIGS. 11C and 11D correspond respectively to views from below the installed fixtures shown in FIGS. 11A and 11B; the view shown in FIG. 10 is analogous to that shown in FIG. 11D. The views shown in FIGS. 11A/C depict an optimal installation with the housing and reflector essentially orthogonal to the ceiling structure. In contrast, FIGS. 11B/D show the housing mounted non-orthogonally to the ceiling, but with the reflector positionable orthogonally to the ceiling. Thus, these views show the reflector misaligned with the housing but in the position desired to provide the designed lighting. Prior art housings cannot accomodate being installed non-orthogonally to the ceiling and thus must be removed and reinstalled, or are left as installed to provide sub-optimal lighting and an unaesthetic appearance.

The inventive device can be installed as follows. The support bars are secured to the housing by the retaining clips and are extended/contracted to be of approximately the same length as the distance between the joists where the fixture is to be mounted. The fixture is then mounted between the joists by fixably attaching the support bars at their flanges to the joists by nailing or using the nail tab. External wiring is introduced into the junction box through a conduit and preferably is held by the wiring clip. A splice is made in the junction box between the external wiring and the wiring to the socket. At this point it is commonplace to allow the socket to hang down through the interior of the housing with a bulb in place to provide "temporary lighting." When it is desired to complete installation, the ceiling panel is positioned, a hole is cut below the aperture defined by the housing, and the panel is installed. The socket is connected to the reflector design desired (after removal of the bulb) and the reflector/socket assembly is positioned by inserting the reflector into the housing so that the retaining springs frictionally engage the housing; the reflector is positioned such that the reflector trim is essentially flush with the ceiling. As mentioned, the reflector can be positioned at the desired depth and desired angle within the housing to provide desired optics to the environment.

After the lighting fixture is installed, the ceiling structure usually must be at least partially disassembled for examination of the wiring by the building inspector. The present junction box is disposed generally orthogonally to the support bar, so the junction box can be opened without obstruction from any element of the fixture. Further, the junction box is likely to be disposed in an open area of the ceiling structure for easy inspection. Still further, the L-shaped junction box door allows the inspector to view the splicing in the box from below, thereby facilitating inspection and reducing the time needed to disassemble and reassemble the junction box and ceiling structure. As shown in FIG. 10, the junction box is disposed such that it is easily accessible when the ceiling is removed without having to disassemble or unsecure the fixture. Also, as mentioned previously, the junction box door (only the bottom face 73b is shown in this Figure) opens from the bottom, and thus provides easy inspection. Because the junction box back panel 37 is removable, it allows the wiring to be inspected even after the ceiling is complete.

Still another advantage created by the present invention relates to safety. Instructions relating to the type of fixture (IC or non-IC) are usually found on a label adhesively applied to the inside of the housing fixture. The prior art use of a partial reflector that is not selectively removable from the housing permanently obfuscates these instructions, thereby allowing for the use of an improper bulb and creating possibly dangerous conditions. The selectively removable full reflector of this invention allows easy access to the indicia listing requirements and usage adhesively applied (usually by the manufacturer) to the inside of the housing for the particular installation.

These and other benefits as well as other modifications of the invention may become apparent to the ordinary artisan, and such are intended to be within the scope and spirit of the invention as defined by the claims.

What is claimed is:

1. A junction box comprising:
   a top wall having a first, free front edge and a first back edge, said first back edge joined to a back wall;
   a bottom wall having a second, free front edge and a second back edge, said second back edge joined to said back wall such that said top wall, said bottom wall and said back wall define an interior space;
   a first side wall having a third, free front edge and a third back edge, said third back edge joined to said back wall;
   a second side wall having a fourth, free front edge and a fourth back edge, said fourth back edge joined to said backwall, with at least one of said third or fourth back edges of said side walls flexibly joined to said back wall so as to permit flexing of at least one of said side walls towards and away from said interior space;
   a front panel disposed opposite said back wall and adapted to be releasably mounted to said junction box at said first and said second free front edges of said top and bottom walls;
a retaining clip attached to said top wall;
a slot disposed within said bottom wall; and
a notch and a tab disposed on said front panel, such that said retaining clip engages said notch, and said slot engages said tab to releasably secure said front panel to said junction box.

* * * * *